(12) United States Patent
Krämer et al.

(10) Patent No.: US 9,242,381 B2
(45) Date of Patent: Jan. 26, 2016

(54) GRIPPER

(71) Applicant: AREVA GmbH, Erlangen (DE)

(72) Inventors: Georg Krämer, Wiesenttal (DE);
Konrad Meier-Hynek, Herzogenaurach (DE); Lothar Nehr, Hallstadt (DE)

(73) Assignee: AREVA GMBH, Erlangen (DE)

( * ) Notice: Subject to any disclaimer, the term of this patent is extended or adjusted under 35 U.S.C. 154(b) by 0 days.

(21) Appl. No.: 14/407,899

(22) PCT Filed: Jun. 11, 2013

(86) PCT No.: PCT/EP2013/062044
§ 371 (c)(1),
(2) Date: Dec. 12, 2014

(87) PCT Pub. No.: WO2013/186219
PCT Pub. Date: Dec. 19, 2013

(65) Prior Publication Data
US 2015/0123415 A1 May 7, 2015

(30) Foreign Application Priority Data

Jun. 13, 2012 (DE) .......................... 10 2012 209 921

(51) Int. Cl.
*B66C 1/54* (2006.01)
*B25J 15/00* (2006.01)
(Continued)

(52) U.S. Cl.
CPC .......... *B25J 15/0047* (2013.01); *B25J 15/0009* (2013.01); *B25J 15/0028* (2013.01); *B25J 15/0293* (2013.01); *B25J 15/086* (2013.01); *B25J 15/10* (2013.01)

(58) Field of Classification Search
CPC ............... B25J 15/0047; B25J 15/0028; B25J 15/0293; B25J 15/086; B25J 15/10; B25J 15/083
USPC .............................. 294/97, 95, 86.24, 115, 90
See application file for complete search history.

(56) References Cited

U.S. PATENT DOCUMENTS 923,299 A * 6/1909 Rogers ..................... B25B 9/00
294/115
967,566 A * 8/1910 Russell ................... E21B 31/20
294/86.14

(Continued)

FOREIGN PATENT DOCUMENTS

CN 201677319 U 12/2010
CN 101973036 A 2/2011
(Continued)

OTHER PUBLICATIONS

International Application No. PCT/EP13/62044 International Preliminary Report on Patentability Dated Dec. 16, 2014 (8 Pages).

*Primary Examiner* — Gabriela Puig
(74) *Attorney, Agent, or Firm* — Keller Jolley Preece

(57) ABSTRACT

The invention relates to a gripper for raising and lowering loads and having the following configuration:—it comprises a coupling part and a connecting part,—the connecting part is guided on the coupling part for movement along a movement axis between a first end position and a second end position, wherein those ends of the aforementioned parts which are oriented away from one another are further apart from one another in the first end position than in the second end position,—at least two catch elements are present on the coupling part and can be moved between a gripping position, in which they use a rear-engagement surface to engage behind a mating element of the load, and a release position, in which they release the mating element,—the connecting part is connected to the at least two catch elements via at least one gear mechanism.

17 Claims, 4 Drawing Sheets

(51) Int. Cl.
  *B25J 15/02* (2006.01)
  *B25J 15/08* (2006.01)
  *B25J 15/10* (2006.01)

(56) References Cited

U.S. PATENT DOCUMENTS

| | | | |
|---|---|---|---|
| 1,169,004 A | 1/1916 | Cargin | |
| 1,317,500 A | 9/1919 | Holmquist | |
| 2,358,632 A * | 9/1944 | Gerken | A01B 1/18 294/115 |
| 2,486,489 A * | 11/1949 | McDermott | D01D 7/02 294/95 |
| 2,789,859 A * | 4/1957 | Woellner | B66C 1/54 294/90 |
| 2,885,010 A * | 5/1959 | Frost | E21B 23/00 166/123 |
| 3,019,840 A * | 2/1962 | Kennard | E21B 29/00 166/237 |
| 3,116,663 A * | 1/1964 | Musgrave | B64D 1/06 294/82.26 |
| 4,032,185 A * | 6/1977 | Peyton | B65G 47/842 198/443 |
| 4,253,695 A | 3/1981 | Blaive et al. | |
| 4,362,692 A | 12/1982 | Greenaway | |
| 4,418,770 A * | 12/1983 | Lambot | E21B 23/04 166/217 |
| 6,439,632 B1 * | 8/2002 | Webber | B66C 1/54 294/97 |
| 2010/0078951 A1 * | 4/2010 | Van Os | B25B 27/06 294/97 |

FOREIGN PATENT DOCUMENTS

| | | |
|---|---|---|
| DE | 70 10 910 U | 7/1970 |
| DE | 44 10 395 A1 | 9/1995 |
| FR | 2 199 525 A1 | 4/1974 |
| GB | 1 135 535 A | 12/1968 |
| GB | 2 080 243 A | 2/1982 |

\* cited by examiner

GRIPPER

CROSS-REFERENCE TO RELATED APPLICATIONS

This application is a national phase entry under 35 U.S.C. §371 of International Application No. PCT/EP2013/062044, filed Jun. 11, 2013, which claims the benefit of German Application No. 10 2012 209 921.2, filed Jun. 13, 2012. The entire contents of each of the foregoing patent applications are hereby incorporated by reference.

BACKGROUND OF THE INVENTION

1. Field of the Invention

The invention relates to a gripper for raising and lowering loads.

2. Background and Relevant Art

Under normal conditions, the load and the gripper are visible to an operator, such that the operation of the gripper, that is to say coupling to a load and uncoupling or releasing the load when the latter has reached its intended position in which it is placed on a surface, presents no particular problems. This is different if local conditions make it impossible to observe the coupling or uncoupling procedure. Such situations are frequently encountered in the context of transport tasks in nuclear power stations, if for example a load in a fuel element storage pool, which is up to 12 m tall and filled with water, is to be transported, i.e. lowered and/or raised. If in addition restricted spatial conditions are present, visual operation is excluded. Such a situation exists for example if cracks in the wall of a fuel element storage pool are to be sealed and fuel elements contained in storage racks are positioned in front of this wall, such that only a narrow gap exists between these frames and the wall.

BRIEF SUMMARY OF THE INVENTION

Hence, the object of the invention is to propose a gripper of the type mentioned in the introduction, by means of which loads at unobservable locations can be deposited at a predefined height position.

This object is achieved by means of a gripper having the features of claim 1. It comprises a coupling part for coupling to a load and a connecting part for connecting to an endstop means, for example a cable or a rod. The two parts are now not rigidly connected to one another. Rather, the connecting part is guided movably on the coupling part along a movement axis, which runs in a vertical direction when raising or lowering a load, between a first end position and a second end position. In the first end position those ends of the connecting part and of the coupling part which are oriented away from one another are further apart from each other than in the second end position.

In order to be able to affix a load to the gripper, at least two catch elements are present on the coupling part and can be moved between a gripping position, in which they grip behind a counter-element of the load by means of a rear-gripping face, and a release position, in which they release or do not grip behind the counter-element. The axial mobility of the connecting part or the relative mobility of the connecting part and the coupling part is used in order to actuate the catch elements. The connecting part is connected or coupled to the at least one catch element via at least one transmission such that in the first end position of the connecting part the catch elements are in their gripping position and in its second end position of the connecting part the catch elements are in their release position.

In order to distribute the weight of the load as evenly as possible on the gripper, the at least two catch elements are arranged spaced apart from one another, in particular evenly spaced apart, in the circumferential direction of an imaginary circle which concentrically surrounds a central longitudinal axis of the gripper, which central longitudinal axis extends parallel to the movement axis.

Furthermore, in the gripping position, the separation between the catch elements and the central longitudinal axis is greater than in the release position. The movement coupling between the connecting part and the coupling part has the effect that the catch elements can be moved between the gripping position and the release position. In order for it to be possible to couple to the load and to release the load, the movement of the catch elements must run transversely with respect to the movement axis of the connecting part or must at least have a movement component running in this direction. In other words, in the gripping and release positions, the catch elements are at different radial positions with respect to the central longitudinal axis. They thus move away from the central longitudinal axis when they are moved into their gripping position. The counter-element which cooperates with the catch elements is e.g. the rim of a receiving opening present on the upper side of the load. Since the catch elements are arranged closer to the central longitudinal axis when in the release position than when in the gripping position, it is possible, when the width or diameter of the receiving opening is suitably matched, for the coupling part with catch elements in the release position to be removed from the receiving opening and, vice versa, in the case of coupling the gripper to the load, to be inserted into the receiving opening, in which case the catch elements are then moved into their gripping position, in which they grip, by means of their rear-gripping face, behind the rim of the opening on the downward-oriented side of the latter.

The described configuration makes it possible for the gripper to automatically adopt its release position when the load is deposited on a surface, that is to say has reached its intended position. To that end, it need simply be ensured that the connecting part is moved vertically against the coupling part and thus the at least two catch elements of the coupling part are moved into their release position. In contrast with remote-controlled operation of the gripper, e.g. via a wireless or wired connection, measures for detecting the intended position of the load, for example via surveillance by means of cameras or with the aid of position sensors, are not necessary.

Inserting the coupling part into the receiving opening is further facilitated in that that end section of the coupling part which is oriented away from the connecting part is configured in the form of a centering bolt which tapers toward its free end and projects, in the direction of the central longitudinal axis, past the ends of the catch elements with a projection.

In one preferred configuration, the centering bolt has recesses distributed circumferentially, into which in each case one catch element at least partially enters when in its release position.

In one preferred embodiment variant, the connecting part is prestressed into its first end position. In this manner, the at least two catch elements are held securely in their gripping position. The prestress must be overcome in order that they might adopt their release position. The force necessary to do this can be applied by means of the weight of the connecting part, i.e. the weight of the connecting part is selected such that the weight force exerted thereby when the movement axis or the central longitudinal axis of the gripper including an endstop means, a cable or similar, is greater than the prestress force. It is however also conceivable that the connecting part is attached to a rigid endstop means such as a rod, such that a force overcoming the prestress can be exerted on the connecting part via the rigid element. The prestress is preferably achieved by means of a spring element, preferably a helical compression spring, which presses on one hand against the coupling part and on the other hand against the connecting part.

The relative movement between the connection part and the coupling part in the case of releasing the load requires that the coupling part be held fast in the axial direction. To that end, in a preferred embodiment variant, an endstop having an endstop face is arranged on the coupling part. This endstop is configured and positioned such that, in the case of a load which is resting on a surface and if the gripper continues to move downwards, the endstop abuts against the load via its endstop face. From this moment on, the coupling part is axially fixed with respect to the connecting part, such that the connecting part which is moving downward in the direction of the movement axis, into its second end position, moves the at least two catch elements into their release position. Releasing thus occurs automatically when the load is supported by a surface and is in its intended position, and when the gripper is moved slightly further vertically downward.

In another preferred embodiment variant, coupling is made easier by virtue of the fact that the catch elements have, on that end oriented away from the connecting part, an actuating incline whose inclination is chosen such that, when acted upon by an upward force acting in the movement direction, the catch elements are moved into their release position. In the case of a receiving opening, into which the coupling part or the catch elements are to be inserted, the force is applied when the actuating inclines meet the rim of the receiving opening.

A transmission which serves for the movement coupling of the connecting part and the catch element, and which is preferably present between each catch element and the connecting part, is configured such that the linear movement of the connecting part is converted into a movement of the catch levers which runs transversely to the movement axis or to the central longitudinal axis of the gripper or which has a movement component with such a direction, in particular a rotational movement. A coupling transmission or lever transmission is particularly suitable for this. In the case of a rotational movement of the catch elements, such a transmission forms, together with the connecting part, a slider-crank transmission.

In the case of a configuration which improves handling of the gripper, there is provided a latching device which releasably secures the connecting part to the coupling part in its second end position. In other words, the connecting part is releasably attached to the coupling part in an axially fixed manner. If a load is deposited on a surface, it is first necessary, in order to uncouple the gripper from the load, to push the connecting part toward the load, in order to move the catch elements into their release position. The abovementioned locking takes place once this has been done. The gripper can then be removed from the load by being moved vertically upward. The latching device comprises a latching element which is mounted on the coupling part or on the connecting part such that it can move radially—with respect to the central longitudinal axis of the gripper or with respect to the movement axis—and which, in the second end position, engages in a recess of the respective other part. In that context, in particularly preferred embodiment variants, the latching element is prestressed in the engagement direction. This is advantageous in that the catch elements are locked in their release position entirely automatically, such that in this case too no control measures or surveillance measures, such as cameras or a position sensor system, are necessary.

BRIEF DESCRIPTION OF THE DRAWINGS

Other advantageous configurations indicated in further subclaims will be described in the course of the following description of the invention, with reference to the appended drawings, in which:

DETAILED DESCRIPTION

Figure 1:
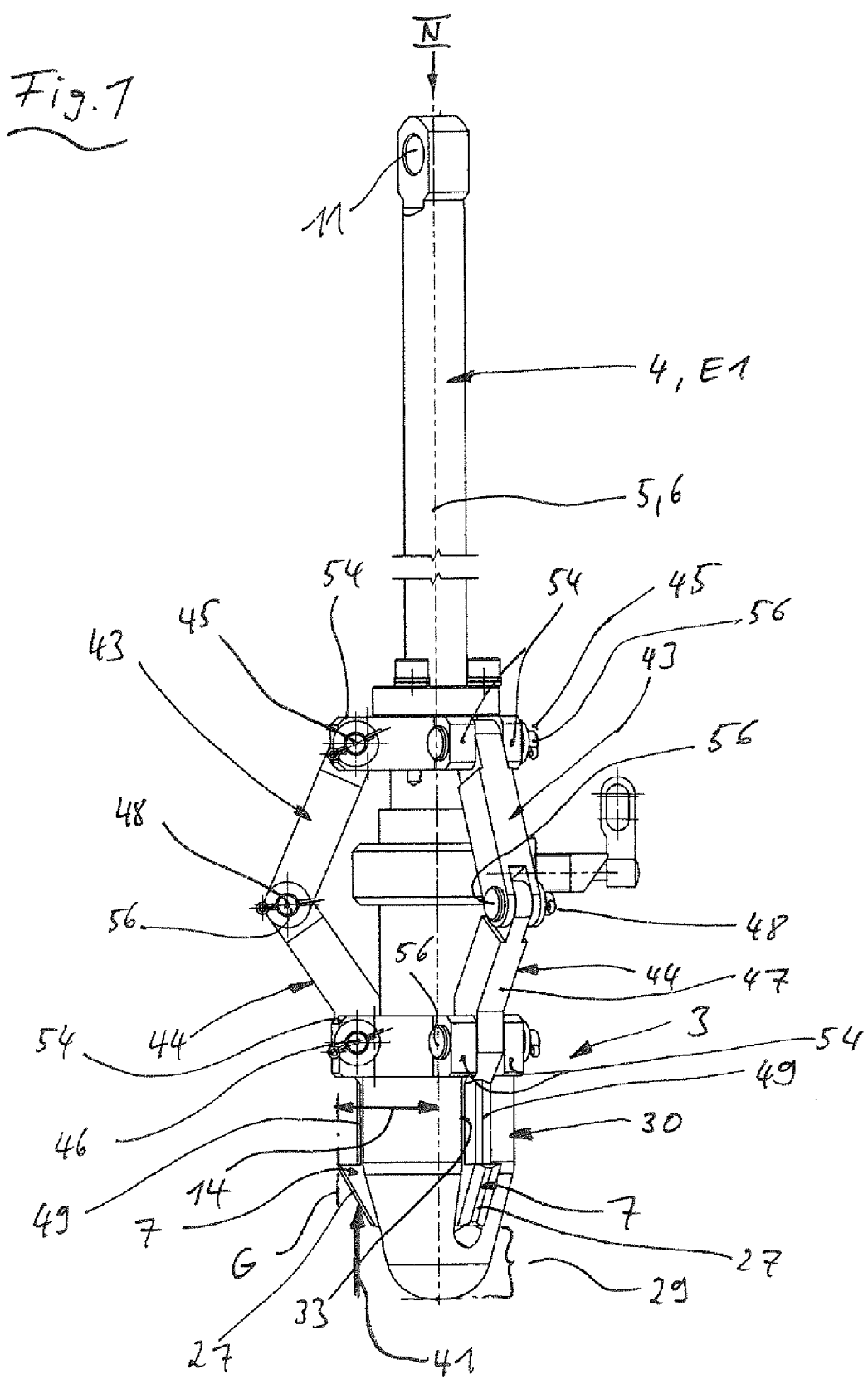
FIG. 1 is a perspective representation of a gripper.

The gripper 1 shown in the depictions comprises a coupling part 3 for coupling to a load 2 and a connecting part 4 for connecting to an endstop means, for example a cable or a rod. To that end, an eye 11 is present at the free end of the connecting part 4 which has an approximately rod-like overall shape. The two parts are free to move relative to each other along a movement axis 5, between a first end position E1 and a second end position E2. For the sake of simplicity, in the following the connecting part is said to be movable with respect to the coupling part, for instance guided thereon. When in use, that is to say when a load 2 is lowered or raised, the movement axis 5 runs in a vertical direction. Of course, numerous parallel movement axes exist. For reasons of clarity, in the depictions, an exemplary movement axis 5 was chosen which is identical to the central longitudinal axis 6. Both axes are therefore represented in the drawings as a single line. In the exemplary embodiment, the movement axis 5 simultaneously forms the central longitudinal axis 6 of the gripper 1. In the first end position E1, the gripper is longer overall than in the second end position E2 of the connecting part 4. In other words, in the first end position E1 those ends of the connecting part and of the coupling part which are oriented away from one another are further apart from each other than in the second end position E2.

Figure 3:
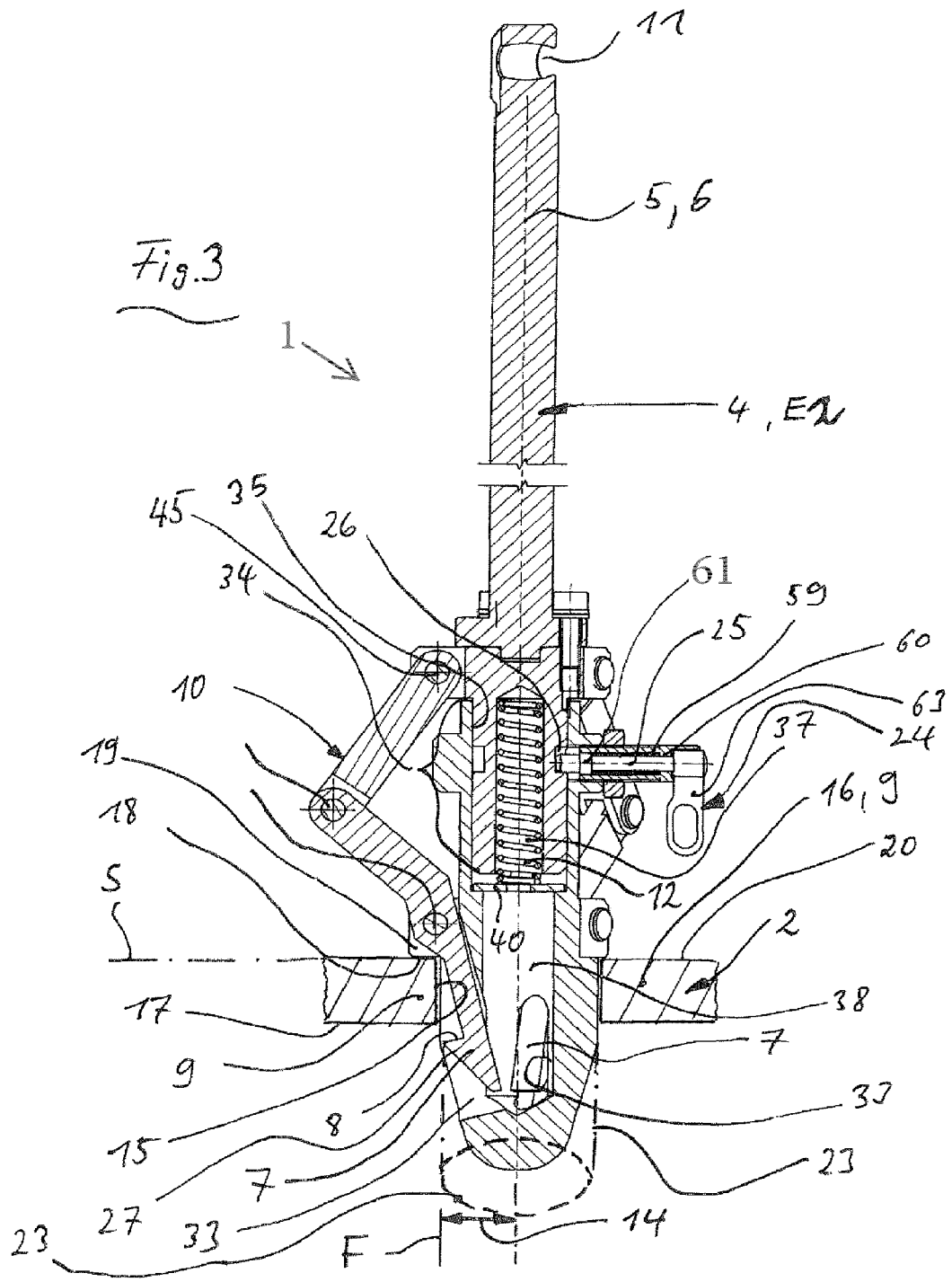
FIG. 3 is a representation corresponding to FIG. 2, but wherein the gripper is shown in a situation in which it is releasing the load.
Figure 4:
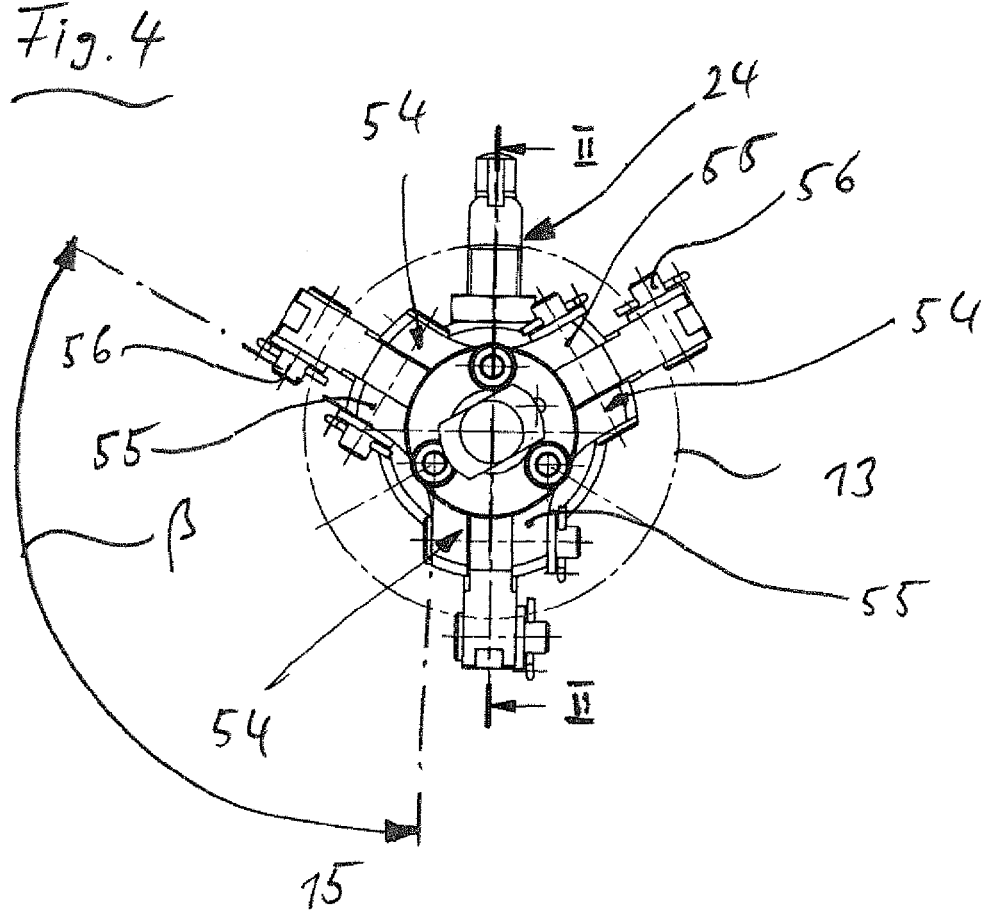
FIG. 4 is a plan view in the direction of the arrow IV in FIG. 1.
Figure 5:
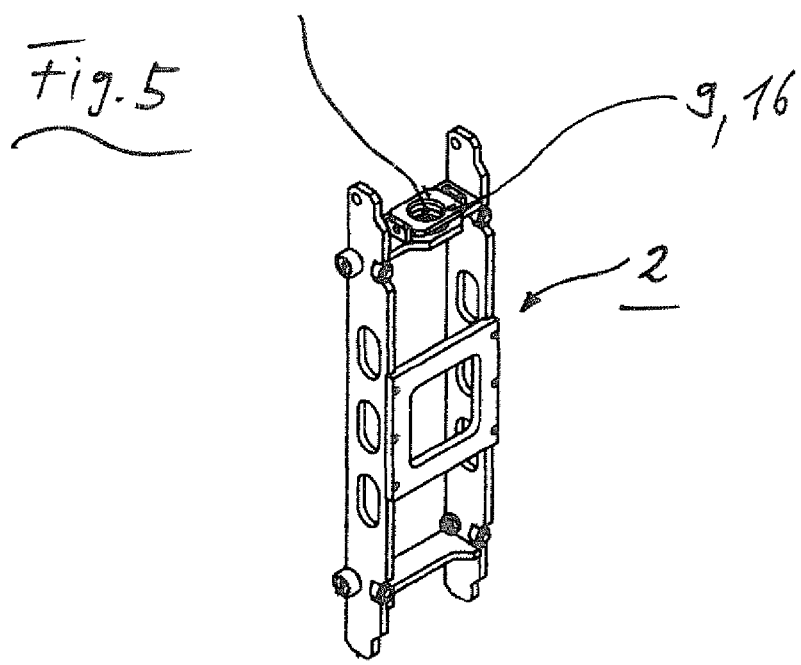
FIG. 5 shows a sled, which can be used for repairing cracks in fuel element storage ponds, as an example of a load.

Three catch elements 7 are present on the coupling part 3 and can be moved between a gripping position (FIG. 1, 2) and a release position F (FIG. 3). In the gripping position, the catch elements 7 grip behind a counter-element 9 of the load 2 by means of a rear-gripping face 8. In the release position F, they release the counter-element 9 or the load 2, i.e. the gripper 1 can be removed from the load 2 when the latter is deposited on a surface, that is to say has adopted its intended position S.

The catch elements 7 are each connected to the connecting part 4 via a transmission 10 in the manner of a movement coupling, such that in the first end position E1 the catch elements 7 are in their gripping position G and in the second end position E2 the catch elements are in their release position F.

The catch elements 7 are movably secured to the coupling part 3 such that they are respectively located at the same axial position and have the same separation with respect to the central longitudinal axis 6 or to the movement axis 5. With reference to an imaginary circle 13 which concentrically surrounds the central longitudinal axis 6, the catch elements are arranged evenly spaced apart from one another in the circumferential direction of the circle 13. Furthermore, the catch elements 7 are mounted on the coupling part 3 such that, in the gripping position G, the separation 14 between the catch elements and the central longitudinal axis 6 is greater than in the release position F. In other words, when moving from their release position F (FIG. 3) into their gripping position G, the catch elements 7 move radially outward with respect to the central longitudinal axis 6, that is to say away from the latter. By virtue of this configuration, the gripper is particularly suited to being inserted into a receiving opening 15 on a load 2, by means of its coupling part 3, wherein the rim 16 or rim region bounding the abovementioned opening forms the counter-element 9. The catch elements 7 grip behind the rim 16 of the opening on that side 17 of it which, in use, is oriented vertically downward. The rear-gripping faces 8 of the catch elements 7 then bear against the side 17.

The connecting part 4 is prestressed into its first end position E1, wherein to that end a spring element, preferably a helical compression spring 12, which presses on one hand against the coupling part 3 and on the other hand against the connecting part 4, is present. In order that the transmission 10 can be effective and the catch elements 7 can be moved from their gripping position G into their release position F, it is necessary to overcome the force of the spring element. To that end, it is first necessary for the coupling part 3 to be held in an axially secured manner with respect to the movement axis 5 or the central longitudinal axis 6. To that end, an endstop 19 having an endstop face 18 is arranged on the coupling part. The endstop 19 is configured and positioned such that, in the case of a load 2 which is in its intended position and if the gripper 1 continues to move downwards, the endstop abuts against the load 2 via its endstop face 18. In the case of a receiving opening 15 receiving the forward section of the coupling part 3, the endstop face 18 extends—relative to the central longitudinal axis 6—radially outward until it overlaps with the rim 16 of the opening and bears against the upper side 20 of the latter, which is oriented upward in use (see FIG. 3).

Once the endstop 19 bears against the counter-element 9, a vertically downward movement of the connecting part 4 causes, via the transmission 10, the catch elements 7 to be moved into their release position. In this position, as previously stated, the separation with respect to the central longitudinal axis 6 is reduced in comparison with the gripping position G such that the catch elements 7 or their rear-gripping faces 8 are arranged inside a circumcircle 23 which circumscribes the catch elements 7 and whose diameter is smaller than the diameter of the receiving opening 15. In the described position, the gripper 1 or the coupling part 3 may then be withdrawn upward from the receiving opening 15. In so doing, the coupling part 3 must be held in its second end position E2, which may be effected in various ways, in particular by means of a latching device 24 which releasably secures the connecting part 4 in its second end position E2.

The latching device 24, which is attached to the coupling part 3, comprises a latching element 25 which can move transversely to the movement axis 5 or central longitudinal axis 6 and which, in the second end position E2 of the connecting part 4, engages in a recess 26 of the connecting part 4.

Figure 2:
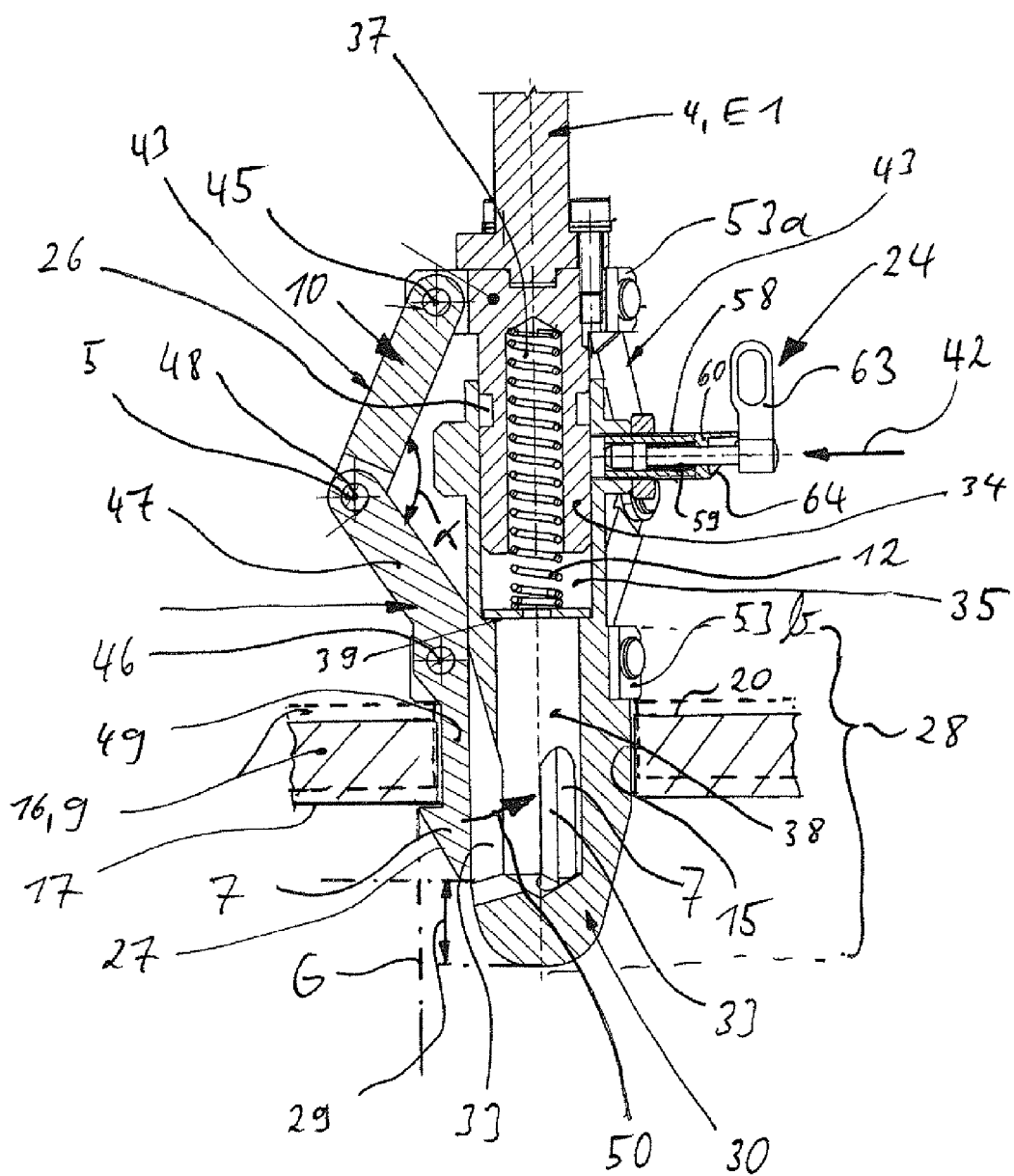
FIG. 2 is a longitudinal section along line II-II in FIG. 4, wherein the gripper is coupled to a load.

The gripper 1 is e.g. coupled to a load 2 by means of catch elements 7 which are in the release position F, wherein the forward end of the coupling part 3 is inserted into the receiving opening 15 of the load. In that context, the release position of the catch elements is secured with the aid of the latching device 24. When the endstop 19 abuts against the counter-element 9, the securing effected by the latching device 24 is released, whereby the connecting part 4 is moved vertically upwards by means of the spring element or the helical compression spring 12, into its first end position E1, and the catch elements 7 are moved into their gripping position G. A situation corresponding to FIG. 2 then exists. Such a procedure is expedient if a load 2 to be raised is located in a position which can be observed only with difficulty.

In an alternative coupling variant, the connecting part 4 is in its first end position E1, i.e. the catch elements 7 are in their gripping position G, the latching element 25, which is prestressed in the engagement direction 42, presses against a circumferential face of the connecting part 3 but is not in engagement with the recess 26. In order to facilitate the insertion of the coupling part 3 into the receiving opening 15 of the load 2, the catch elements 7 have, at their end oriented away from the connecting part 4, an actuating incline 27. The inclination of the actuating incline is chosen such that, when acted upon by a vertical upward force 41, as is the case when the actuating inclines meet the rim 16 of the receiving opening 15, the catch elements 7 are moved radially inward into their release position F.

Inserting the coupling part into a receiving opening 16 is further facilitated in that that end section 28 of the coupling part 3 which is oriented away from the connecting part is configured in the form of a centering bolt 30 which tapers toward its free end and projects axially, in the direction of the movement axis 5, past the catch elements 7 with a projection 29. Recesses 33, into which in each case one catch element 7 at least partially enters when in its release position F, are distributed in the circumferential direction of the centering bolt 30.

The coupling part 3 and the connecting part 4 are movably secured to one another with the aid of a telescopic guide. To that end, the connecting part 4 has, on an end region oriented toward the coupling part 3, an e.g. cylindrical guiding section 34. A recess 35, configured so as to be complementary to the guiding section 34 and in which the guiding section 34 is held so as to be axially displaceable, is present in that end section of the coupling part 3 which is oriented toward the connecting part 4. The guiding section 34 has a central spring space 37 which opens into its end side which in use is oriented downward, in which spring space the helical compression spring 12 is arranged. The recess 35 continues into a blind hole 38 which extends toward the lower end of the coupling part 3. This blind hole is narrower than the recess 35, wherein an upward-oriented radial shoulder 39 is present between it and the recess 35. A supporting disk 40, against which one end of the helical compression spring 12 bears, rests on this radial shoulder. The other end of the helical compression spring 12 presses against the base of the recess 35.

The transmissions 10 are configured as coupling transmissions, in particular as lever transmissions. They comprise a one-armed lever 43 which is connected at one end to the connecting part 4 via a first joint 45 and a two-armed lever 44 which is connected to the coupling part 3 via a second joint 46. The two-armed lever 44 comprises a power arm 47 whose free end is connected to the other end of the one-armed lever 43 via a third joint 48, and a load arm 49 at the free end of which in each case one catch element 7 is attached, in particular formed integrally therewith. The recesses 33 which receive the catch elements 7 in their release position F are dimensioned such that they can in each case receive the load arms 49 with their catch elements 7 located thereon. The one-armed lever 43 and the power arm 47 enclose an obtuse angle α which is smaller than 180° and opens toward the central longitudinal axis 6. If when lowering a load 2 the latter has reached its intended position, and if the connecting part continues to move downward, the endstop 19 abuts against the counter-element 9 of the load 2 by means of its endstop face 18. This causes the load arm 49 to pivot toward the central longitudinal axis 6 (see arrow 50 in FIG. 2).

The first joints 45 and the second joints 46 are respectively arranged on a collar 53a, 53b which grips in clamping fashion around the outer periphery of the connecting part 4 or, respectively, of the coupling part 3. The collars 53a, b each have three protrusions 54 which are identically spaced as seen in the circumferential direction and on which the first and second joints 45, 46 are arranged. The collars 53a, b are formed by a total of three webs 55 whose free ends form the protrusions 54 and enclose an angle β, oriented away from the central longitudinal axis 6, of approximately 120°. Between two circumferentially adjacent protrusions 54 there is arranged, in the case of the collar 53a, in each case that end of the one-armed lever 43 which is oriented away from the two-armed lever 44 and, in the case of the collar 53b, in each case one two-armed lever 44 by means of its central region. The joints 45, 46 and 48 are hinge joints. They have a joint pin 56 which passes through the protrusions 54 and the levers 43 and 44.

The latching device 24 comprises a cylindrical housing 58 which is arranged on the coupling part and in which the pin-shaped latching element 25 is mounted in a movable manner such that its movement direction extends transversely to the central longitudinal axis 6 or to the movement axis 5. The prestress in the engagement direction 42 is achieved with the aid of a helical compression spring 59 which coaxially surrounds the latching element 25. That end of this spring which is radially outward with respect to the central longitudinal axis 6 presses against a radial shoulder 60 of the housing 58. The other end of the helical compression spring 59 acts on a flange 61 which projects beyond the outer circumference of the latching element 25. The radially outward end of the latching element 25 is connected to a rotary lever 63 which extends perpendicular to the longitudinal direction of the latching element. The rotary lever 63 cooperates with an inclined slideway 64 at the radially outer end of the housing 58. In the situation shown in FIG. 3, the rotary lever 63 is pointing downward. If in the case of this rotational position the connecting part 4 is in its first end position (FIG. 1), the latching element 25 bears, by means of its radially inner end, against a region of the guiding section 34 located below the recess 26. If the connecting part 4 is brought into its second end position E2, the latching element 25 automatically latches into the recess 26 due to being acted upon by the helical compression spring 59. If the rotary lever faces upward (FIGS. 1 and 2), the latching element 25 is secured in a position in which its radially inner end is radially separated from the guiding section 34 and therefore does not act upon the latter. The connecting part 4 is thus not automatically locked in its second end position E2.

The invention claimed is:

1. A gripper for raising and lowering loads, comprising:
   a coupling part for coupling to a load and a connecting part for connecting to an endstop means,
   the connecting part is guided movably on the coupling part along a movement axis between a first end position and a second end position, wherein in the first end position ends of the connecting part and the coupling part are oriented away from one another and are further apart from each other than in the second end position,
   at least two catch elements are present on the coupling part and can be moved between a gripping position, in which they grip behind a counter-element of the load by means of a rear-gripping face, and a release position, in which they release the counter-element,
   the connecting part is connected to the at least two catch elements via at least one transmission such that in the first end position the catch elements are in their gripping position and in the second end position the catch elements are in their release position,
   the at least two catch elements are arranged spaced apart from one another in the circumferential direction of an imaginary circle which concentrically surrounds a central longitudinal axis of the gripper, which central longitudinal axis runs parallel to the movement axis,
   in the gripping position, the separation between the catch elements and the central longitudinal axis is greater than in the release position,
   an end section of the coupling part, which is oriented away from the connecting part and is configured in the form of a centering bolt which tapers toward its free end and projects axially, in the direction of the central longitudinal axis, past the catch elements with a projection.

2. The gripper as claimed in claim 1, characterized in that the connecting part is prestressed into its first end position.

3. The gripper as claimed in claim 2, characterized by a spring element which presses on one hand against the coupling part and on the other hand against the connecting part.

4. The gripper as claimed in claim 3, characterized in that the spring element is a helical compression spring.

5. The gripper as claimed in claim 1, characterized by an endstop which is arranged on the coupling part, has an endstop face and is configured and positioned such that, in the case of a load which is resting on a surface and if the gripper continues to move downwards, the endstop bears against the load via its endstop face.

6. The gripper as claimed in claim 1, characterized in that the catch elements have, on that end oriented away from the connecting part, an actuating incline whose inclination is chosen such that, when acted upon by an upward force acting in the direction of the movement axis, the catch elements are moved into their release position.

7. The gripper as claimed in claim 6, characterized by a transmission which converts the linear motion of the connecting part into a rotational movement of the catch element.

8. The gripper as claimed in claim 7, characterized in that the transmission is a lever transmission.

9. The gripper as claimed in claim 7, characterized in that every catch element is connected to the connecting part via a transmission.

10. The gripper as claimed in claim 9, characterized in that the transmission comprises a one-armed lever which is connected at its end to the connecting part via a first joint and a two-armed lever which is connected to the coupling part via a second joint, wherein a power arm of the two-armed lever is connected to the other end of the one-armed lever via a third joint, and the load arm of the two-armed lever carries a catch element at its free end.

11. The gripper as claimed in claim 10, characterized in that the joints are hinge joints.

12. The gripper as claimed in claim 1, characterized by a latching device which releasably secures the connecting part in its second end position.

13. The gripper as claimed in claim 12, characterized in that the latching device-comprises a latching element which is mounted on the coupling part or on the connecting part such that it can move transversely to the movement direction and which, in the second end position, engages in a recess of the respective other part.

14. The gripper as claimed in claim 12, characterized in that the latching element is prestressed in the engagement direction.

15. The gripper as claimed in claim 1, characterized by a telescopic guide between the coupling part and the connecting part.

16. The gripper as claimed in claim 15, characterized in that the coupling part or the connecting part has an axially oriented recess in which the respective other part having a guiding section is guided such that it can move axially.

17. The gripper as claimed in claim 1, characterized in that the centering bolt has recesses distributed about its circumference, into which in each case one catch element at least partially enters when in its release position.

* * * * *